US008603631B2

(12) United States Patent
Helbing

(10) Patent No.: US 8,603,631 B2
(45) Date of Patent: *Dec. 10, 2013

(54) POLYESTER BINDING COMPOSITIONS

(75) Inventors: Clarence H. Helbing, Shelbyville, IN (US); Mary Hession, legal representative, Indianapolis, IN (US); James Helbing, legal representative, Indianapolis, IN (US)

(73) Assignee: Knauf Insulation GmbH, Shelbyville, IN (US)

( * ) Notice: Subject to any disclaimer, the term of this patent is extended or adjusted under 35 U.S.C. 154(b) by 1208 days.

This patent is subject to a terminal disclaimer.

(21) Appl. No.: 11/577,130

(22) PCT Filed: Oct. 11, 2005

(86) PCT No.: PCT/US2005/036332
§ 371 (c)(1),
(2), (4) Date: Sep. 18, 2009

(87) PCT Pub. No.: WO2006/044302
PCT Pub. Date: Apr. 27, 2006

(65) Prior Publication Data
US 2010/0092785 A1  Apr. 15, 2010

Related U.S. Application Data

(60) Provisional application No. 60/618,441, filed on Oct. 13, 2004, provisional application No. 60/700,486, filed on Jul. 19, 2005.

(51) Int. Cl.
*D02G 3/00* (2006.01)
*C08F 8/32* (2006.01)

(52) U.S. Cl.
USPC ............ 428/375; 428/297.4; 428/299.4; 428/298.7; 428/300.1; 428/392; 528/272; 528/279; 528/296; 525/327.6; 525/327.4; 427/384; 427/385.5; 427/389.7; 427/389.9; 524/556

(58) Field of Classification Search
None
See application file for complete search history.

(56) References Cited

U.S. PATENT DOCUMENTS

| | | |
|---|---|---|
| 1,801,052 A | 4/1931 | Meigs |
| 1,801,053 A | 4/1931 | Meigs |
| 1,886,353 A | 11/1932 | Novotny et al. |
| 2,215,825 A | 9/1940 | Wallace |
| 2,392,105 A | 1/1946 | Sussman |
| 3,232,821 A | 2/1966 | Moore et al. |
| 3,297,419 A | 1/1967 | Eyre, Jr. |
| 3,791,807 A | 2/1974 | Etzel |
| 3,802,897 A | 4/1974 | Voigt et al. |
| 3,809,664 A | 5/1974 | Fanta |
| 3,826,767 A | 7/1974 | Hoover et al. |
| 3,856,606 A | 12/1974 | Fan et al. |
| 3,867,119 A | 2/1975 | Kasuga et al. |
| 3,911,048 A | 10/1975 | Vargiu et al. |
| 4,014,726 A | 3/1977 | Fargo |
| 4,028,290 A | 6/1977 | Reid |
| 4,048,127 A | 9/1977 | Gibbons et al. |
| 4,054,713 A | 10/1977 | Sakaguchi et al. |
| 4,097,427 A | 6/1978 | Aitken et al. |
| 4,107,379 A | 8/1978 | Stofko |
| 4,148,765 A | 4/1979 | Nelson |
| 4,183,997 A | 1/1980 | Stofko |
| 4,233,432 A | 11/1980 | Curtis, Jr. |
| 4,246,367 A | 1/1981 | Curtis, Jr. |
| 4,278,573 A | 7/1981 | Tessler |
| 4,296,173 A | 10/1981 | Fahey |
| 4,301,310 A | 11/1981 | Wagner |
| 4,330,443 A | 5/1982 | Rankin |
| 4,357,194 A | 11/1982 | Stofko |
| 4,400,496 A | 8/1983 | Butler |
| 4,464,523 A | 8/1984 | Neigel |
| 4,524,164 A | 6/1985 | Viswanathan et al. |
| 4,668,716 A | 5/1987 | Pepe et al. |
| 4,692,478 A | 9/1987 | Viswanathan et al. |
| 4,754,056 A | 6/1988 | Ansel et al. |
| 4,845,162 A | 7/1989 | Schmitt et al. |
| 4,906,237 A | 3/1990 | Johansson et al. |
| 4,912,147 A | 3/1990 | Pfoehler et al. |
| 4,923,980 A | 5/1990 | Blomberg |
| 5,037,930 A | 8/1991 | Shih |
| 5,041,595 A | 8/1991 | Yang |
| 5,095,054 A | 3/1992 | Lay |
| 5,106,615 A | 4/1992 | Dikstein |

(Continued)

FOREIGN PATENT DOCUMENTS

| | | |
|---|---|---|
| CA | 2 037 214 | 9/1991 |
| EP | 0 044 614 | 1/1982 |
| EP | 0 524 518 | 7/1992 |
| EP | 0 547 819 | 6/1993 |
| EP | 0 583 086 | 2/1994 |
| EP | 0 672 720 | 9/1995 |
| EP | 0 714 754 | 6/1996 |
| EP | 0826710 | 3/1998 |
| EP | 0 826 710 | 4/1998 |
| EP | 0 873 976 | 10/1998 |

(Continued)

OTHER PUBLICATIONS

English Translation of Japanese Abstract for 58011193, Jan. 21, 1983, 1 page.

(Continued)

*Primary Examiner* — Jill Gray
(74) *Attorney, Agent, or Firm* — Knauf Insulation GmbH; James K. Blodgett

(57) ABSTRACT

Disclosed are formaldehyde-free, thermally-curable, alkaline, aqueous binder compositions. The disclosed binder compositions may be cured to substantially water-insoluble thermoset polyester resins, including formaldehyde-free, substantially water-insoluble thermoset polyester resins. Uses of the disclosed binder compositions as binders for non-woven fibers and fiber materials are also disclosed.

9 Claims, No Drawings

(56) References Cited

U.S. PATENT DOCUMENTS

| | | |
|---|---|---|
| 5,114,004 A | 5/1992 | Isono et al. |
| 5,124,369 A | 6/1992 | Vandichel et al. |
| 5,143,582 A | 9/1992 | Arkens et al. |
| 5,151,465 A | 9/1992 | Le-Khac |
| 5,278,222 A * | 1/1994 | Stack ............................ 524/502 |
| 5,308,896 A | 5/1994 | Hansen et al. |
| 5,318,990 A | 6/1994 | Strauss |
| 5,336,753 A | 8/1994 | Jung et al. |
| 5,336,755 A | 8/1994 | Pape |
| 5,340,868 A | 8/1994 | Strauss et al. |
| 5,371,194 A | 12/1994 | Ferretti |
| 5,387,665 A | 2/1995 | Misawa et al. |
| 5,393,849 A | 2/1995 | Srinivasan et al. |
| 5,434,233 A | 7/1995 | Kiely et al. |
| 5,480,973 A | 1/1996 | Goodlad et al. |
| 5,498,662 A | 3/1996 | Tanaka et al. |
| 5,536,766 A | 7/1996 | Seyffer et al. |
| 5,547,541 A | 8/1996 | Hansen et al. |
| 5,550,189 A | 8/1996 | Qin et al. |
| 5,562,740 A | 10/1996 | Cook et al. |
| 5,571,618 A | 11/1996 | Hansen et al. |
| 5,578,678 A | 11/1996 | Hartmann |
| 5,582,682 A | 12/1996 | Ferretti |
| 5,583,193 A | 12/1996 | Aravindakshan et al. |
| 5,589,536 A | 12/1996 | Golino et al. |
| 5,608,011 A | 3/1997 | Eck et al. |
| 5,609,727 A | 3/1997 | Hansen et al. |
| 5,614,570 A | 3/1997 | Hansen et al. |
| 5,620,940 A | 4/1997 | Birbara et al. |
| 5,621,026 A | 4/1997 | Tanaka et al. |
| 5,633,298 A | 5/1997 | Arfaei et al. |
| 5,643,978 A | 7/1997 | Darwin et al. |
| 5,645,756 A | 7/1997 | Dubin et al. |
| 5,661,213 A | 8/1997 | Arkens et al. |
| 5,690,715 A | 11/1997 | Schiwek |
| 5,691,060 A | 11/1997 | Levy |
| 5,693,411 A | 12/1997 | Hansen et al. |
| 5,756,580 A | 5/1998 | Natori et al. |
| 5,788,243 A | 8/1998 | Harshaw et al. |
| 5,855,987 A | 1/1999 | Margel et al. |
| 5,885,337 A | 3/1999 | Nohr et al. |
| 5,895,804 A | 4/1999 | Lee et al. |
| 5,919,831 A | 7/1999 | Philipp |
| 5,925,722 A | 7/1999 | Exner et al. |
| 5,929,184 A | 7/1999 | Holmes-Farley et al. |
| 5,932,344 A | 8/1999 | Ikemoto et al. |
| 5,932,665 A * | 8/1999 | DePorter et al. .............. 525/381 |
| 5,932,689 A | 8/1999 | Arkens et al. |
| 5,942,123 A | 8/1999 | McArdle |
| 5,977,224 A | 11/1999 | Cheung et al. |
| 5,977,232 A | 11/1999 | Arkens et al. |
| 5,981,719 A | 11/1999 | Woiszwillo et al. |
| 5,983,586 A | 11/1999 | Berdan, II et al. |
| 5,990,216 A | 11/1999 | Cai et al. |
| 6,071,994 A * | 6/2000 | Hummerich et al. ......... 524/247 |
| 6,072,086 A | 6/2000 | James et al. |
| 6,077,883 A | 6/2000 | Taylor et al. |
| 6,090,925 A | 7/2000 | Woiszwillo et al. |
| 6,114,033 A | 9/2000 | Ikemoto et al. |
| 6,114,464 A | 9/2000 | Reck et al. |
| 6,136,916 A | 10/2000 | Arkens et al. |
| 6,171,654 B1 | 1/2001 | Salsman et al. |
| 6,210,472 B1 | 4/2001 | Kwan et al. |
| 6,221,973 B1 | 4/2001 | Arkens et al. |
| 6,299,936 B1 | 10/2001 | Reck et al. |
| 6,310,227 B1 | 10/2001 | Sarama et al. |
| 6,313,102 B1 | 11/2001 | Colaco et al. |
| 6,319,683 B1 | 11/2001 | James et al. |
| 6,331,350 B1 | 12/2001 | Taylor et al. |
| 6,348,530 B1 | 2/2002 | Reck et al. |
| 6,379,739 B1 | 4/2002 | Formanek et al. |
| 6,395,856 B1 | 5/2002 | Petty et al. |
| 6,440,204 B1 | 8/2002 | Rogols et al. |
| 6,468,442 B2 | 10/2002 | Bytnar |
| 6,468,730 B2 | 10/2002 | Fujiwara et al. |
| 6,482,875 B2 | 11/2002 | Lorenz et al. |
| 6,495,656 B1 | 12/2002 | Haile et al. |
| 6,525,009 B2 | 2/2003 | Sachdev et al. |
| 6,638,884 B2 | 10/2003 | Quick et al. |
| 6,699,945 B1 * | 3/2004 | Chen et al. .................... 525/445 |
| 6,753,361 B2 | 6/2004 | Kroner et al. |
| 6,818,694 B2 | 11/2004 | Hindi et al. |
| 6,852,247 B2 | 2/2005 | Bytnar |
| 6,858,074 B2 | 2/2005 | Anderson et al. |
| 6,861,495 B2 | 3/2005 | Barsotti et al. |
| 6,864,044 B2 | 3/2005 | Ishikawa et al. |
| 6,955,844 B2 | 10/2005 | Tagge et al. |
| 7,029,717 B1 | 4/2006 | Ojima et al. |
| 7,067,579 B2 | 6/2006 | Taylor et al. |
| 7,090,745 B2 | 8/2006 | Beckman et al. |
| 7,141,626 B2 | 11/2006 | Rodrigues et al. |
| 7,195,792 B2 | 3/2007 | Boston et al. |
| 7,201,778 B2 | 4/2007 | Smith et al. |
| 7,655,711 B2 * | 2/2010 | Swift et al. ...................... 524/14 |
| 7,772,347 B2 * | 8/2010 | Swift et al. .................... 527/312 |
| 7,795,354 B2 * | 9/2010 | Srinivasan et al. ......... 525/327.6 |
| 7,803,879 B2 * | 9/2010 | Srinivasan et al. ......... 525/327.6 |
| 7,807,771 B2 * | 10/2010 | Swift et al. .................... 527/312 |
| 7,854,980 B2 * | 12/2010 | Jackson et al. .................. 428/45 |
| 7,888,445 B2 | 2/2011 | Swift et al. |
| 7,947,765 B2 | 5/2011 | Swift et al. |
| 8,080,488 B2 * | 12/2011 | Anderson et al. ............. 442/391 |
| 8,193,106 B2 * | 6/2012 | Shooshtari et al. ........... 442/180 |
| 2002/0032253 A1 | 3/2002 | Lorenz et al. |
| 2002/0091185 A1 | 7/2002 | Taylor et al. |
| 2002/0130439 A1 | 9/2002 | Kroner et al. |
| 2002/0161108 A1 | 10/2002 | Schultz et al. |
| 2003/0005857 A1 | 1/2003 | Minami et al. |
| 2003/0153690 A1 | 8/2003 | Husemoen et al. |
| 2004/0019168 A1 | 1/2004 | Soerens et al. |
| 2004/0024170 A1 | 2/2004 | Husemoen et al. |
| 2004/0033747 A1 | 2/2004 | Miller et al. |
| 2004/0038017 A1 | 2/2004 | Tutin et al. |
| 2004/0077055 A1 | 4/2004 | Fosdick et al. |
| 2004/0122166 A1 | 6/2004 | O'Brien-Bernini et al. |
| 2004/0152824 A1 | 8/2004 | Dobrowolski |
| 2004/0213930 A1 | 10/2004 | Halabisky |
| 2004/0249066 A1 | 12/2004 | Heinzman et al. |
| 2004/0254285 A1 | 12/2004 | Rodrigues et al. |
| 2005/0048212 A1 | 3/2005 | Clamen et al. |
| 2005/0059770 A1 * | 3/2005 | Srinivasan et al. ............. 524/494 |
| 2005/0171085 A1 | 8/2005 | Pinto et al. |
| 2005/0196421 A1 | 9/2005 | Hunter et al. |
| 2005/0202224 A1 * | 9/2005 | Helbing .................... 428/292.1 |
| 2005/0215153 A1 | 9/2005 | Cossement et al. |
| 2005/0275133 A1 | 12/2005 | Cabell et al. |
| 2006/0099870 A1 | 5/2006 | Garcia et al. |
| 2006/0111480 A1 | 5/2006 | Hansen et al. |
| 2006/0135433 A1 | 6/2006 | Murray et al. |
| 2006/0252855 A1 | 11/2006 | Pisanova et al. |
| 2007/0006390 A1 | 1/2007 | Clamen et al. |
| 2007/0009582 A1 | 1/2007 | Madsen et al. |
| 2007/0027281 A1 | 2/2007 | Michl et al. |
| 2008/0108741 A1 | 5/2008 | Van Herwijnen |
| 2009/0227732 A1 * | 9/2009 | Glockner et al. ............. 524/591 |
| 2009/0301972 A1 | 12/2009 | Hines et al. |
| 2009/0324915 A1 | 12/2009 | Swift et al. |
| 2010/0029160 A1 * | 2/2010 | Srinivasan et al. ............. 442/327 |
| 2011/0089074 A1 * | 4/2011 | Jackson et al. ............. 206/524.1 |
| 2011/0190425 A1 * | 8/2011 | Swift .............................. 524/35 |
| 2011/0220835 A1 | 9/2011 | Swift et al. |

FOREIGN PATENT DOCUMENTS

| | | |
|---|---|---|
| EP | 0 882 756 | 12/1998 |
| EP | 0 911 361 | 4/1999 |
| EP | 0 990 729 | 4/2000 |
| EP | 1 038 433 | 9/2000 |
| EP | 1 193 288 | 4/2002 |
| EP | 1 382 642 | 1/2004 |
| EP | 1 486 547 | 12/2004 |
| EP | 1 732 968 | 9/2005 |
| FR | 2 614 388 | 10/1988 |
| GB | 2 078 805 | 1/1982 |

(56) References Cited

FOREIGN PATENT DOCUMENTS

| | | |
|---|---|---|
| JP | 57-101100 | 6/1982 |
| JP | 58011193 | 1/1983 |
| JP | 03173680 | 7/1991 |
| JP | 07034023 | 2/1995 |
| JP | 2002-293576 | 9/2002 |
| JP | 2004-60058 | 2/2004 |
| SU | 374400 | 3/1973 |
| WO | 99/36368 | 7/1999 |
| WO | 99/47765 | 9/1999 |
| WO | 00/62628 | 10/2000 |
| WO | 03/071879 | 9/2003 |
| WO | 03/106561 | 12/2003 |
| WO | 2004/076734 | 9/2004 |
| WO | WO2005087837 | 9/2005 |
| WO | 2006/044302 | 4/2006 |
| WO | 2007/014236 | 2/2007 |

OTHER PUBLICATIONS

English Translation of Japanese Abstract for 03173680, Jul. 26, 1991, 1 page.
English Translation of Japanese Abstract for 07034023, Feb. 3, 1995, 1 page.
English Translation of Russian Abstract for 374400, Mar. 20, 1973, 1 page.
Ames, J. M., "The Maillard Browning Reaction—an Update", Chemistry & Industry, No. 17, 1988, 4 pages.
"Gamma-aminopropyltrimethoxysilane", Hawley's Condensed Chemical Dictionary, 14th Edition, John Wiley & Sons, Inc., 2002, 1 page.
PCT International Search Report for PCT/US2005/036332 completed by the EP Searching Authority on Feb. 22, 2006.
Clamen, Guy, "Acrylic Thermosets: A Safe Alternative to Formaldehyde Resins", Nonwovens World, Apr.-May 2004.

\* cited by examiner

POLYESTER BINDING COMPOSITIONS

CROSS REFERENCE TO RELATED APPLICATIONS

This application is a U.S. national counterpart application of international application serial No. PCT/US2005/036332 filed Oct. 11, 2005, which claims priority to U.S. Provisional Patent Application No. 60/618,441, filed Oct. 13, 2004 and to U.S. Provisional Patent Application No. 60/700,486, filed Jul. 19, 2005. The entireties of the disclosures of PCT/US2005/036332, U.S. Ser. No. 60/618,441, and U.S. Ser. No. 60/700,486 are hereby incorporated herein by reference.

TECHNICAL FIELD OF THE DISCLOSURE

The present disclosure pertains to binder compositions for nonwoven fibers. In particular, the present disclosure pertains to thermally-curable, polyester binders for nonwoven fibers.

BACKGROUND

Fiberglass insulation products generally include matted glass fibers that are held together by a cured thermoset polymeric resole resin. During production of such products, streams of molten glass are drawn into fibers of varying lengths and then blown into a forming chamber where they are deposited with little organization, or in varying patterns, as a mat onto a traveling conveyor. The fibers, while in transit in the forming chamber and while still hot from the drawing operation, are sprayed with an aqueous resin binder solution. The residual heat from the glass fibers and the flow of air through the fibrous mat during the forming operation will generally evaporate most of the water from the resin binder, thereby leaving the remaining components of the binder on the fibers as a viscous or semi-viscous high-solids liquid. The resulting coated fibrous mat is generally referred to as a "wet blanket." The coated fibrous mat or wet blanket, which is formed in a compressed state due to the high-velocity flow of air through the mat in the forming chamber, is then transferred out of the forming chamber to a transfer zone where the mat vertically expands due to the resiliency of the glass fibers. This vertical expansion can be important in the manufacture process of commercially acceptable fiberglass thermal or acoustical insulation products. Subsequently, the coated mat is transferred to a curing oven where heated air is blown through the mat to cure the binder and rigidly attach the glass fibers together.

Resole resin is a phenol-aldehyde resin having a molar ratio of phenol to aldehyde of about 1:1.1 to about 1:5. Preferably the phenol to aldehyde ratio is from about 1:2 to about 1:3. The phenol component of the resole resin can include a variety of substituted and unsubstituted phenolic compounds. The aldehyde component of the resole resin is preferably formaldehyde, but can include so-called masked aldehydes or aldehyde equivalents such as acetals or hemiacetals. Specific examples of suitable aldehydes include: formaldehyde, acetaldehyde, propionaldehyde, butyraldehyde, furfuraldehyde, and benzaldehyde.

Phenol-formaldehyde (PF) resole resins, as well as phenol-formaldehyde resole resins extended with urea (PFU resins), are used in conventional processes, and have been relied on heavily over the past several years to prepare binders for fiberglass insulation products. Though these resins are inexpensive and provide the cured fiberglass insulation product with the desired physical properties, they may often have high free formaldehyde content, and a distinctive or unpleasant odor limiting their use in certain applications. Further, during the manufacture of fiberglass insulation, the potential for formaldehyde emissions and worker exposure is present. Therefore, manufacturing facilities using PF and PFU resole resins as the main binder component for insulation products are often required to install expensive controls in order to minimize the possible exposure of workers to formaldehyde emissions and to install expensive abatement equipment for the process exhaust gases to meet certain Maximum Achievable Control Technology (MACT) requirement standards. Options for formaldehyde-free products or processes include i) adding a formaldehyde scavenger to the binder to reduce or remove free formaldehyde and thereby limit its subsequent emission and/or odor; ii) allowing the resin reaction to proceed for longer periods of time to reduce the free formaldehyde present in the resin product; or iii) utilizing formaldehyde-free resin formulations.

The use of formaldehyde scavengers may lead to precipitation, resulting from the scavenger itself and/or the adduct between the scavenger and any residual formaldehyde being insoluble. Further, allowing the resin reaction to proceed for an extended period of time sufficient to afford target formaldehyde levels results in a resin product having a concomitantly higher molecular weight. Such higher molecular weight resins may lack the desirable properties for some applications, as many tend to be sticky, causing the binder and the binder-coated fiberglass product to adhere to production equipment. Furthermore, higher molecular weight PF resole resins tend to have a higher "tetradimer" content. Tetradimer is a highly crystalline PF dimer present in phenolic resins produced under base-catalyzed conditions, which often precipitates readily. Precipitation is even more likely when free formaldehyde in the resin is scavenged. Tetradimer precipitation can result in plugged spray nozzles, and in precipitate formation in resin binder storage tanks and in the resin itself, necessitating removal.

Accordingly, as an alternative to PF and PFU resole resins, formaldehyde-free resin formulations have received increased attention for use as binders in making fiberglass insulation and other products.

SUMMARY

Aqueous binder compositions are described. In one aspect, the aqueous binder composition is formaldehyde-free. In another aspect, the aqueous binder composition is thermally-curable. In another aspect, the aqueous binder composition has an alkaline pH. An aqueous binder composition for use in manufacturing fiber products, including non-woven fiber products such as fiber products composed of fiberglass and/or other fibers, including heat-resistant fibers and the like, is also described. The aqueous binder compositions and associated methods for using the binder compositions may include one or more of the features or combinations of features described herein.

In one illustrative embodiment, the aqueous binder composition cures to a formaldehyde-free, substantially water-insoluble thermoset polyester resin. In another illustrative embodiment, the composition includes one or more polyacid component having acid groups, or anhydride or salt derivatives thereof, and a plurality of polyhydroxy components having hydroxyl groups, where the pH of the binder composition is greater than about 7, and illustratively also less than or equal to about 10. In another illustrative embodiment, the composition includes one or more polyacid component and a plurality of polyhydroxy components where the ratio of the number of molar equivalents of acid groups, or anhydride or salt derivatives thereof, present on the polyacid component(s) to the number of molar equivalents of hydroxyl groups present on the plurality of polyhydroxy components is in the range from about 0.7:1 to about 1.3:1. In one variation, the number of molar equivalents of acid groups, or anhydride or salt derivatives thereof, present on the polyacid component(s) are in excess. In another variation, the number of molar equivalents of hydroxyl groups present on the plurality of polyhydroxy components are in excess. In yet another variation, the ratio of the number of molar equivalents of acid groups, or anhydride or salt derivatives thereof, present on the polyacid component(s) to the number of molar equivalents of hydroxyl groups present on the plurality of polyhydroxy components is about 1.3:1. In still another variation, the ratio of the number of molar equivalents of acid groups, or anhydride or salt derivatives thereof, present on the polyacid component(s) to the number of molar equivalents of hydroxyl groups present on the plurality of polyhydroxy components is about 1:1.

In another illustrative embodiment, the composition includes one or more polyacid component that is a dicarboxylic acid, including, but not limited to, unsaturated aliphatic dicarboxylic acids, saturated aliphatic dicarboxylic acids, aromatic dicarboxylic acids, unsaturated cyclic dicarboxylic acids, saturated cyclic dicarboxylic acids, hydroxy-substituted derivatives thereof, and the like, and salts and anhydride derivatives thereof. In another illustrative embodiment, the composition includes one or more polyacid component that is a tricarboxylic acid, including, but not limited to, unsaturated aliphatic tricarboxylic acids, saturated aliphatic tricarboxylic acids, aromatic tricarboxylic acids, unsaturated cyclic tricarboxylic acids, saturated cyclic tricarboxylic acids, hydroxy-substituted derivatives thereof, and the like, and salts and anhydride derivatives thereof. In another illustrative embodiment, the composition includes one or more polyacid component that is a tetracarboxylic, pentacarboxylic, and like polycarboxylic acids, and salts and anhydride derivatives thereof, and combinations thereof. It is appreciated that any of these polyacids may be optionally substituted, such as with hydroxy, halo, alkyl, alkoxy, and the like. In one illustrative aspect, the composition is an alkaline composition, where the polyacid component(s) is neutralized by the addition of a base or where certain salts of the polyacid component(s) are used. In another illustrative embodiment, the composition includes one or more polyacid component, such as succinic acid, citric acid, or fumaric acid and the like that has been neutralized by the addition of a base, or is a salt. In another illustrative embodiment, the polyacid component is maleic acid neutralized with, for example, an amine such as aqueous ammonia. In another illustrative embodiment, the polyacid component is the ammonium salt of maleate.

In another illustrative embodiment, the plurality of polyhydroxy components is a mixture of a partially hydrolyzed polyvinyl acetate, such as, for example, an ELVANOL (available from DuPont Packaging and Industrial Polymers; Wilmington, Del.; USA), and a fully hydrolyzed polyvinyl acetate, such as, for example, a MOWIOL (available from Clariant; Clear Lake, Tex., USA). It is appreciated that additional partially hydrolyzed polyvinyl acetates and/or fully hydrolyzed polyvinyl acetates, such as, for example, a CELVOL (available from Celanese; Calvert City, Ky., USA) may be included in the binder compositions described herein.

In another illustrative embodiment, the composition further includes a catalyst, such as an acid or an acid/salt, including inorganic and organic acids, and salts thereof. Illustrative organic acids include sulfonic acids and salts thereof, such as para-toluene sulfonic acid, ammonium para-toluene sulfonate, ammonium naphthalene disulfonate, and the like. It is appreciated that such catalysts may be capable of increasing the rate of ester formation during curing of the binder compositions described herein. In another illustrative embodiment, the composition further includes a silicon-containing compound, such as silylethers and alkylsilyl ethers, which may be optionally substituted, such as with halogen, alkoxy, amino, and the like. In one aspect, the silicon-containing compound is an amino-substituted silicon-containing compound, including, but not limited to, gamma-aminopropyltriethoxysilane. It is appreciated that the silicon-containing compound may serve as a coupling agent during curing of the binder compositions described herein.

In another illustrative embodiment, a method for treating fibers, including non-woven fibers, is described. In an illustrative aspect, the method includes contacting fibers with a thermally-curable, aqueous binder composition including one or more polyacid component and a plurality of polyhydroxy components, as described herein, wherein the pH of the binder composition is greater than about 7, and illustratively also less than or equal to about 10, and heating the thermally-curable, aqueous binder composition at an elevated temperature that is sufficient to cure the binder composition to form a polyester. In one aspect, the polyester is substantially water-insoluble. In another aspect, the polyester is a thermoset resin.

In another illustrative embodiment, a glass fiber product is described. The glass fiber product includes a composition obtained by heating a thermally-curable, aqueous binder composition described herein that has been applied to fibers, such as a mat of non-woven fibers. In one aspect, the pH of the binder composition is greater than about 7, and illustratively also less than or equal to about 10. In one embodiment, the binder composition includes one or more polyacid component and a plurality of polyhydroxy components as described herein.

DETAILED DESCRIPTION

In an illustrative embodiment, a formaldehyde-free, thermally-curable, alkaline, aqueous binder composition is described. The binder composition includes one or more polyacid component having acid groups, or anhydride or salt derivatives thereof, and a plurality of polyhydroxy components having hydroxyl groups, where the pH of the binder composition is greater than about 7, and illustratively also less than or equal to about 10. The composition may be used as a binder for non-woven fibers, such as, for example, for fiberglass in the manufacture of insulation products. In one embodiment, it has been discovered that when a formaldehyde-free, alkaline, aqueous binder composition, including one or more polyacid component and a plurality of polyhydroxy components, as described herein, is heated for short periods of time in the absence of a catalyst capable of accelerating or increasing the rate of chemical reaction, a substantially water-insoluble thermoset polyester resin is produced. Thus, one or more polyacid component has been found to be capable of reacting with a plurality of polyhydroxy components, under alkaline, aqueous conditions in the absence of a catalyst, to form a thermoset polyester resin.

In an illustrative embodiment, the formaldehyde-free, thermally-curable, alkaline, aqueous binder composition is substantially unreacted when it is applied to a substrate, such as a sample of non-woven fibers. Upon heating, the binder is dried and thermal curing is accomplished. It is to be understood that the drying and thermal curing may occur either sequentially, contemporaneously, or concurrently. As used herein, the term "thermally-curable" is intended to indicate that a structural or morphological change in the aqueous binder occurs upon heating that is sufficient to alter the properties of non-woven fibers to which an effective amount of binder has been applied; such changes include, but are not necessarily limited to, covalent reaction of components of the binder, including cross-linking, improved adhesion of the binder components to the substrate, and hydrogen bonding of binder components.

The term "formaldehyde-free," as used herein, is meant to indicate that the aqueous binder composition is substantially free from formaldehyde, and/or does not liberate substantial formaldehyde as a result of drying and/or curing; typically, less than about 1 ppm formaldehyde, based on the weight of the composition, is present or releasable in a formaldehyde-free composition.

As used herein, the term "alkaline" is meant to indicate a solution pH that is greater than about 7, and illustratively also less than or equal to about 10.

As used herein, the term "aqueous" includes water and mixtures composed substantially of water and other water-miscible solvents including, but not limited to, alcohols, ethers, amines, polar aprotic solvents, and the like.

As used herein, the terms "fiberglass," "non-woven fiber," and "glass fiber" are meant to indicate heat-resistant fibers suitable for withstanding elevated temperatures, such as mineral fibers, aramid fibers, ceramic fibers, metal fibers, carbon fibers, polyimide fibers, certain polyester fibers, rayon fibers, and glass fibers. Illustratively, such fibers are substantially unaffected by exposure to temperatures above about 120° C.

In an illustrative embodiment, the formaldehyde-free, thermally-curable, alkaline, aqueous binder composition includes one or more polyacid component having acid groups, or anhydride or salt derivatives thereof. In one aspect, the polyacid component(s) is sufficiently nonvolatile to maximize its ability to remain available for reaction with the polyhydroxy component. The polyacid component(s) may be substituted with other chemical functional groups. It is appreciated that other functional groups are selected to minimize their interference with the preparation or formation of the polyester resin. Illustratively, the polyacid component(s) may be a dicarboxylic acid, such as, for example, maleic acid. Other suitable polyacid components are contemplated to include, but are not limited to, aconitic acid, adipic acid, azelaic acid, butane tetracarboxylic acid dihydride, butane tricarboxylic acid, chlorendic acid, citraconic acid, citric acid, dicyclopentadiene-maleic acid adducts, diethylenetriamine pentaacetic acid, adducts of dipentene and maleic acid, endomethylenehexachlorophthalic acid, ethylenediamine tetraacetic acid (EDTA), fully maleated rosin, maleated tall-oil fatty acids, fumaric acid, glutaric acid, isophthalic acid, itaconic acid, maleated rosin oxidized with potassium peroxide to alcohol then carboxylic acid, malic acid, mesaconic acid, biphenol A or bisphenol F reacted via the KOLBE-Schmidt reaction with carbon dioxide to introduce 3-4 carboxyl groups, oxalic acid, phthalic acid, polylactic acid, sebacic acid, succinic acid, tartaric acid, terephthalic acid, tetrabromophthalic acid, tetrachlorophthalic acid, tetrahydrophthalic acid, trimellitic acid, trimesic acid, and the like, and anhydrides and salts thereof, and combinations thereof.

In an illustrative embodiment, the acid groups of the polyacid component(s) of the formaldehyde-free, thermally-curable, alkaline, aqueous binder composition are neutralized with a base, and thereby converted to acid salt groups, prior to their reaction with the hydroxyl groups of the plurality of polyhydroxy components to form the polyester resin. It is understood that complete neutralization, i.e., about 100% calculated on an equivalents basis, may eliminate any need to titrate or partially neutralize acid groups in the polyacid component(s) prior to polyester formation, but it is anticipated that less-than-complete neutralization would not inhibit formation of the polyester. "Base," as used herein, refers to a base which may be substantially volatile or non-volatile under conditions sufficient to promote formation of the polyester. Illustratively, the base may be a volatile base, such as, for example, aqueous ammonia; alternatively, the base may be a non-volatile base, such as, for example, sodium carbonate, and other non-volatile bases, such as sodium hydroxide, potassium hydroxide, and the like are contemplated. Neutralization may be carried out either before or after the polyacid component(s) is mixed with the plurality of polyhydroxy components.

In an illustrative embodiment, the formaldehyde-free, thermally-curable, alkaline, aqueous binder composition includes a plurality of polyhydroxy components having hydroxyl groups. In one aspect, the plurality of polyhydroxy components is sufficiently nonvolatile to maximize its ability to remain available for reaction with the polyacid component(s). The plurality of polyhydroxy components may illustratively be a mixture of polyvinyl alcohols, a mixture of partially hydrolyzed polyvinyl acetates, a mixture of fully hydrolyzed polyvinyl acetates, or a mixture of partially hydrolyzed and fully hydrolyzed polyvinyl acetates. Illustratively, when a partially hydrolyzed polyvinyl acetate serves as a component of the plurality of polyhydroxy components, an 87-89% hydrolyzed polyvinyl acetate may be utilized, such as, for example, DuPont ELVANOL 51-05, having a molecular weight of about 22,000-26,000 Da and a viscosity of about 5.0-6.0 centipoises. Other partially hydrolyzed polyvinyl acetates contemplated to be useful in preparing binder compositions as described herein include, but are not limited to, 87-89% hydrolyzed polyvinyl acetates differing in molecular weight and viscosity from ELVANOL 51-05, such as, for example, DuPont ELVANOL 51-04, ELVANOL 51-08, ELVANOL 50-14, ELVANOL 52-22, ELVANOL 50-26, ELVANOL 50-42; and partially hydrolyzed polyvinyl acetates differing in molecular weight, viscosity, and/or degree of hydrolysis from ELVANOL 51-05, such as, for example, DuPont ELVANOL 51-03 (86-89% hydrolyzed), ELVANOL 70-14 (95.0-97.0% hydrolyzed), ELVANOL 70-27 (95.5-96.5% hydrolyzed), ELVANOL 60-30 (90-93% hydrolyzed). Other partially hydrolyzed polyvinyl acetates contemplated to be useful in preparing binder compositions as described herein include, but are not limited to, Clariant MOWIOL 15-79, MOWIOL 3-83, MOWIOL 4-88, MOWIOL 5-88, MOWIOL 8-88, MOWIOL 18-88, MOWIOL 23-88, MOWIOL 26-88, MOWIOL 40-88, MOWIOL 47-88, and MOWIOL 30-92, as well as Celanese CELVOL 203, CELVOL 205, CELVOL 502, CELVOL 504, CELVOL 513, CELVOL 523, CELVOL 523TV, CELVOL 530, CELVOL 540, CELVOL 540TV, CELVOL 418, CELVOL 425, and CELVOL 443. Also contemplated to be useful are similar or analogous partially hydrolyzed polyvinyl acetates available from other commercial suppliers.

Illustratively, when a fully hydrolyzed polyvinyl acetate serves as a component of the plurality of polyhydroxy components, Clariant MOWIOL 4-98, having a molecular weight of about 27,000 Da, may be utilized. Other fully hydrolyzed polyvinyl acetates contemplated to be useful include, but are not limited to, DuPont ELVANOL 70-03 (98.0-98.8% hydrolyzed), ELVANOL 70-04 (98.0-98.8% hydrolyzed), ELVANOL 70-06 (98.5-99.2% hydrolyzed), ELVANOL 90-50 (99.0-99.8% hydrolyzed), ELVANOL 70-20 (98.5-99.2% hydrolyzed), ELVANOL 70-30 (98.5-99.2% hydrolyzed), ELVANOL 71-30 (99.0-99.8% hydrolyzed), ELVANOL 70-62 (98.4-99.8% hydrolyzed), ELVANOL 70-63 (98.5-99.2% hydrolyzed), ELVANOL 70-75 (98.5-99.2% hydrolyzed), Clariant MOWIOL 3-98, MOWIOL 6-98, MOWIOL 10-98, MOWIOL 20-98, MOWIOL 56-98, MOWIOL 28-99, and Celanese CELVOL 103, CELVOL 107, CELVOL 305, CELVOL 310, CELVOL 325, CELVOL 325LA, and CELVOL 350, as well as similar or analogous fully hydrolyzed polyvinyl acetates from other commercial suppliers.

In an illustrative embodiment, the formaldehyde-free, thermally-curable, alkaline, aqueous binder composition includes a silicon-containing coupling agent (e.g., organosilicon oil). Many silicon-containing coupling agents are available from the Dow-Corning Corporation, Petrarch Systems, and by the General Electric Company. Illustratively, the silicon-containing coupling agent includes compounds such as silylethers and alkylsilyl ethers, each of which may be optionally substituted, such as with halogen, alkoxy, amino, and the like. In one aspect, the silicon-containing compound is an amino-substituted silane, such as, for example, gamma-aminopropyltriethoxy silane (Dow SILQUEST A-1101; Dow Chemical; Midland, Mich.; USA). In another aspect, the silicon-containing compound is gamma-glycidoxypropyltrimethoxysilane (Dow SILQUEST A-187). When employed in an illustrative embodiment, silicon-containing coupling agents such as the aforementioned typically are present in the binder composition in the range of about 0.2 percent to about 2.0 percent by weight based upon the binder solids.

In an illustrative embodiment, the formaldehyde-free, thermally-curable, alkaline, aqueous binder composition also includes a catalyst capable of increasing the rate of polyester formation during curing of the binder compositions described herein. Illustratively, the catalyst may be an ammonium salt, such as, for example, ammonium para-toluene sulfonate or ammonium naphthalene disulfonate. Other suitable catalysts are contemplated to include, but are not limited to, ammonium sulfate, ammonium chloride, sulfuric acid, lactic acid, lead acetate, sodium acetate, calcium acetate, zinc acetate, organotin compounds, titanium esters, antimony trioxide, germanium salts, sodium hypophosphite, sodium phosphite, methane sulfonic acid and para-toluene sulfonic acid, and mixtures thereof. It is further understood that if an acid catalyst is included, the pH of the binder composition may require adjustment to achieve alkalinity.

In an illustrative embodiment, the formaldehyde-free, thermally-curable, alkaline, aqueous binder composition also includes one or more additives designed to increase the fluidity of the binder composition and/or retard the rate at which the binder composition may undergo gellation. Illustratively, the additives may be compounds such as glycerin, dextrin, substituted polypropylene glycol, and trimethylol propane.

In an illustrative embodiment, the formaldehyde-free, thermally-curable, alkaline, aqueous binder composition may be prepared by admixing about 10-50 weight percent aqueous solution of a polyacid component(s), already neutralized or neutralized in situ in the presence of a plurality of polyhydroxy components, about 10-30 weight percent aqueous solution of a first polyhydroxy component, about 10-30 weight percent aqueous solution of a second polyhydroxy component, and a silicon-containing coupling agent. In one aspect, the binder composition may also include an aqueous solution of a catalyst capable of increasing the rate of polyester formation during curing. In another aspect, the binder composition may also include an additive designed to increase the fluidity of the binder composition and/or retard the rate at which it may undergo gellation. By varying the polyacid component(s), the plurality of polyhydroxy components, the silicon-containing coupling agent, and optional catalyst and fluidity-increasing additive compositions, the initial concentrations thereof, and the mixing ratio of solutions, a wide range of binder solution compositions can be prepared, wherein the pH of the binder composition is alkaline, and illustratively in the range from greater than about 7 to less than or equal to about 10. It is appreciated that the alkaline, formaldehyde-free binder compositions described herein may be advantageous by permitting the use of existing manufacturing equipment in fiberglass manufacturing plants due to common manufacturing processes and curing parameters.

The following examples illustrate specific embodiments in further detail. These examples are provided for illustrative purposes only and should not be construed as limiting the invention or the inventive concept to any particular physical configuration in any way. For instance, although the ratio of the number of molar equivalents of acid groups, or anhydride or salt derivatives thereof, in the polyacid component to the number of molar equivalents of hydroxyl groups in the plurality of polyhydroxy components in EXAMPLES 1 through 8 below is about 1.3:1, and about 1:1 in EXAMPLE 11, it is to be understood that, in variations of the embodiments described herein, this ratio may be altered without affecting the nature of the invention described, such as, for example, including ratios that fall within the range from about 0.7:1 to about 1.3:1. Further, although the following examples include ammonium maleate as the polyacid component, and MOWIOL 4-98 and ELVANOL 51-05 as the plurality of polyhydroxy components, it is to be understood that, in variations of the embodiments described herein, alternative components may be used without affecting the nature of the invention described, such as, for example, including an ammonium salt of a different dicarboxylic acid as the polyacid component, and different mixtures of fully hydrolyzed and/or partially hydrolyzed polyvinyl acetates as the plurality of polyhydroxy components used in the compositions described herein.

EXAMPLE 1

To 69 g of a 14.2% solution of MOWIOL 4-98 (9.8 g) stirring at room temperature were added sequentially 70 g of a 30.6% solution of ammonium maleate (equivalent to 16.6 g of maleic acid solids), 20 g of a 15% solution of ammonium para-toluene sulfonate (3 g), 0.6 g of SILQUEST A-1101 silane, and 41 g of soft water to produce approximately 200 g of solution. This solution exhibited a pH of 7.0, and consisted of approximately 32.6% MOWIOL 4-98, 55.3% maleic acid, 10% ammonium para-toluene sulfonate, and 2% SILQUEST A-1101 silane (as a relative percentage of total dissolved solids), and contained about 15% dissolved solids (as a percentage of total weight of solution).

EXAMPLE 2

To 79 g of a 14.3% blended solution of MOWIOL 4-98 (80%, 9.0 g) and ELVANOL 51-05 (20%, 2.2 g) stirring at room temperature were added sequentially 79 g of a 30.6% solution of ammonium maleate (equivalent to 18.8 g of maleic acid solids), and 43 g of soft water to produce approximately 200 g of solution. This solution exhibited a pH of 7.28, and consisted of approximately 30% MOWIOL 4-98, 7.3% ELVANOL 51-05, and 62.6% maleic acid (as a relative percentage of total dissolved solids), and contained about 15% dissolved solids (as a percentage of total weight of solution).

EXAMPLE 3

To 39 g of a 14.3% blended solution of MOWIOL 4-98 (95%, 5.3 g) and ELVANOL 51-05 (5%, 0.28 g) stirring at room temperature were added sequentially 40 g of a 30.6% solution of ammonium maleate (equivalent to 9.5 g of maleic acid solids), and 21 g of soft water to produce approximately 100 g of solution. This solution consisted of approximately 35.1% MOWIOL 4-98, 1.9% ELVANOL 51-05, and 63.0% maleic acid (as a relative percentage of total dissolved solids), and contained about 15% dissolved solids (as a percentage of total weight of solution).

EXAMPLE 4

To 3.1 g of a 14.5% solution of ELVANOL 51-05 (0.45 g) stirring at room temperature were added sequentially 54 g of a 14.2% solution of MOWIOL 4-98 (7.7 g), 58 g of a 30.6% solution of ammonium maleate (equivalent to 13.8 g of maleic acid solids), 1.7 g of maleinized soybean oil, 2.2 g of an 80% solution of corn syrup (1.8 g), 22.5 g of a 20% solution of ammonium sulfate (4.5 g), 0.6 g of SILQUEST A-1101 silane, 58 g of soft water, and 36.5 g of a 19% solution of ammonia to produce approximately 237 g of solution. This solution exhibited a pH of 10.49, and consisted of approximately 25.2% MOWIOL 4-98, 1.5% ELVANOL 51-05, 45.2% maleic acid, 5.6% maleinized soybean oil, 5.9% corn syrup, 14.7% ammonium sulfate, and 2.0% SILQUEST A-1101 silane (as a relative percentage of total dissolved solids), and contained about 13% dissolved solids (as a percentage of total weight of solution).

EXAMPLE 5

To 3.3 g of a 14.5% solution of ELVANOL 51-05 (0.48 g) stirring at room temperature were added sequentially 57 g of a 14.2% solution of MOWIOL 4-98 (8.1 g), 62 g of a 30.6% solution of ammonium maleate (equivalent to 14.7 g of maleic acid solids), 1.7 g of maleinized soybean oil, 23 g of a 20% solution of ammonium sulfate (4.6 g), 0.6 g of SILQUEST A-1101 silane, 53 g of soft water, and 13.2 g of a 19% solution of ammonia to produce approximately 214 g of solution. This solution exhibited a pH of 9.90, and consisted of approximately 26.8% MOWIOL 4-98, 1.6% ELVANOL 51-05, 48.7% maleic acid, 5.6% maleinized soybean oil, 15.2% ammonium sulfate, and 2.0% SILQUEST A-1101 silane (as a relative percentage of total dissolved solids), and contained about 14% dissolved solids (as a percentage of total weight of solution).

EXAMPLE 6

To 3.5 g of a 14.5% solution of ELVANOL 51-05 (0.51 g) stirring at room temperature were added sequentially 61 g of a 14.2% solution of MOWIOL 4-98 (8.7 g), 66 g of a 30.6% solution of ammonium maleate (equivalent to 15.7 g of maleic acid solids), 23 g of a 20% solution of ammonium sulfate (4.6 g), 0.6 g of SILQUEST A-1101 silane, and 46 g of soft water to produce approximately 200 g of solution. This solution exhibited a pH of 7.60, and consisted of approximately 28.9% MOWIOL 4-98, 1.7% ELVANOL 51-05, 52.1% maleic acid, 15.3% ammonium sulfate, and 2.0% SILQUEST A-1101 silane (as a relative percentage of total dissolved solids), and contained about 15% dissolved solids (as a percentage of total weight of solution).

EXAMPLE 7

To 4.0 g of a 14.5% solution of ELVANOL 51-05 (0.58 g) stirring at room temperature were added sequentially 67 g of a 14.2% solution of MOWIOL 4-98 (9.5 g), 74 g of a 30.6% solution of ammonium maleate (equivalent to 17.6 g of maleic acid solids), 7.5 g of a 20% solution of ammonium sulfate (1.5 g), 0.6 g of SILQUEST A-1101 silane, and 47 g of soft water to produce approximately 200 g of solution. This solution consisted of approximately 31.9% MOWIOL 4-98, 1.9% ELVANOL 51-05, 59.1% maleic acid, 5.0% ammonium sulfate, and 2.0% SILQUEST A-1101 silane (as a relative percentage of total dissolved solids), and contained about 15% dissolved solids (as a percentage of total weight of solution).

EXAMPLE 8

To 4.0 g of a 14.5% solution of ELVANOL 51-05 (0.58 g) stirring at room temperature were added sequentially 68 g of a 14.2% solution of MOWIOL 4-98 (9.7 g), 75 g of a 30.6% solution of ammonium maleate (equivalent to 17.8 g of maleic acid solids), 7.5 g of a 20% solution of ammonium sulfate (1.5 g), 0.06 g of SILQUEST A-1101 silane, and 45 g of soft water to produce approximately 200 g of solution. This solution consisted of approximately 32.7% MOWIOL 4-98, 1.9% ELVANOL 51-05, 60.0% maleic acid, 5.1% ammonium sulfate, and 0.2% SILQUEST A-1101 silane (as a relative percentage of total dissolved solids), and contained about 15% dissolved solids (as a percentage of total weight of solution).

EXAMPLE 9

General Procedure for Curing Binder Compositions from EXAMPLES 1-8

In order to evaluate aqueous binder compositions under thermal curing conditions, 1-g samples of each binder composition, as prepared in EXAMPLES 1-8, were placed onto one or more individual aluminum plates. Each binder composition was then subjected to one or more conventional bake-out/cure conditions in pre-heated ovens in order to produce the corresponding cured binder sample, such as: 0.5 hour at 300° F. (149° C.) and 0.5 hour at 350° F. (177° C.). The various cure conditions are presented in Table 1.

EXAMPLE 10

Testing/Evaluation of Cured Binder Samples from EXAMPLE 9

Dry flexibility, wet strength, and wet metal adhesion were determined for each cured binder sample prepared in EXAMPLE 9 as follows: (a) Dry flexibility was noted as either flexible or brittle; (b) wet strength was noted as either weak or strong; and (c) wet metal adhesion was noted as either tight or loose. Dry flexibility was determined by the extent to which a cured binder sample, generally present as a film adhering to the aluminum plate, resisted breaking upon flexing the plate metal. Wet strength was determined as the extent to which a cured binder sample appeared to have cured, as indicated by its tendency to remain intact and resist breakage, following addition of 10 mL of water and subsequent standing overnight at room temperature. Wet metal adhesion was determined by the extent to which a cured binder sample remained in direct contact with the aluminum plate surface after being immersed in water overnight. The appearance of cured binder samples was also determined. Results of these tests are presented in Table 1.

EXAMPLE 11

To 35.7 gallons (~321 lbs, 145.7 kg) of a 15% solution of MOWIOL 4-98 (~48.2 lbs, 21.9 kg) stirring at room temperature were added sequentially 1.9 gallons (~17 lbs, 7.7 kg) of a 14.5% solution of ELVANOL 51-05 (~2.5 lbs, 1.1 kg), 39.2 gallons (~353 lbs, 160.3 kg) of a 24.5% solution of ammonium maleate (~86.5 lbs, 39.3 kg), 125 g of SILQUEST A-187 silane (~0.27 lbs), and 23.3 gallons of soft water (~195 lbs, 88.5 kg) to produce approximately 100 gallons (~887 lbs, 402.7 kg) of solution. This solution consisted of approximately 35.2% MOWIOL 4-98, 1.8% ELVANOL 51-05, 63.0% maleic acid, and 0.2% SILQUEST A-187 silane (as a relative percentage of total dissolved solids), and contained about 15.5% dissolved solids (as a percentage of total weight of solution). The solution was stirred for several minutes before being transported to a binder pump where it was used in the manufacture of glass fiber insulation, specifically, in the formation of a product traditionally called "amber blanket," although this binder did not impart an amber color, using conventional procedures. Such procedures are described generally in U.S. Pat. No. 5,318,990, the disclosure of which is hereby incorporated herein by reference. Specifications of the cured blanket product made were ¾ lb per square foot (3.66 kg per square meter) density and 1.5 in (3.8 cm) thick. Oven temperature was set at approximately 450° F. (232° C.) for curing. Product exited the oven white in apparent color and well bonded. After collecting a few rolls of experimental cured material, the matt was broken before the oven and uncured material was also collected for experimentation.

EXAMPLE 12

Testing/Evaluation of Cured Blanket from EXAMPLE 11

Emissions, thickness recovery, dust, tensile strength, parting strength, bond strength, water absorption, and hot surface performance were determined for the cured blanket (cured product) or the molded uncured blanket (uncured product) prepared in EXAMPLE 11, and the results are shown in Tables 2-5. Specific conditions for performing these tests are as follows:

Emissions Testing—General

The insulation product (cured product) was monitored for emissions of total volatile organic compounds (TVOCs), formaldehyde, total selected aldehydes in accordance with ASTM D5116 ("Standard Guide for Small-Scale Environmental Chamber Determinations of Organic Emissions from Indoor Materials/Products"), the United States Environmental Protection Agency (USEPA), and the State of Washington IAQ Specification of January, 1994. The emission data were collected over a one-week exposure period and the resultant air concentrations were determined for each of the potential pollutants. Air concentration predictions were computer monitored based on the State of Washington requirements, which include a standard room loading and ASHRAE Standard 62-1999 ventilation conditions. Product loading is based on standard wall usage of 28.1 $m^2$ in a 32 $m^3$ room.

Emissions Testing—Selected Aldehydes

The insulation product was tested in a small-sized environmental chamber 0.0855 $m^3$ in volume with the chemical emissions analytically measured. Emission of selected aldehydes, including formaldehyde, were measured following ASTM D5197 ("Standard Test Method for Determination of Formaldehyde and Other Carbonyl Compounds in Air (Active Sampler Methodology)) using high performance liquid chromatography (HPLC). Solid sorbent cartridges with 2,4-dinitrophenylhydrazine (DNPH) were used to collect formaldehyde and other low-molecular weight carbonyl compounds in the chamber air. The DNPH reagent in the cartridge reacted with collected carbonyl compounds to form the stable hydrazone derivatives retained by the cartridge. The hydrazone derivatives were eluted from a cartridge with HPLC-grade acetonitrile. An aliquot of the sample was analyzed for low-molecular weight aldehyde hydrazone derivatives using reverse-phase high-performance liquid chromatography (HPLC) with UV detection. The absorbances of the derivatives were measured at 360 nm. The mass responses of the resulting peaks were determined using multi-point calibration curves prepared from standard solutions of the hydrazone derivatives. Measurements are reported to a quantifiable level of 0.2 ug based on a standard air volume collection of 45 L.

Emissions Testing—Volatile Organic Compounds (VOC)

VOC measurements were made using gas chromatography with mass spectrometric detection (GC/MS). Chamber air was collected onto a solid sorbent which was then thermally desorbed into the GC/MS. The sorbent collection technique, separation, and detection analysis methodology has been adapted from techniques presented by the USEPA and other researchers. The technique follows USEPA Method 1P-1B and is generally applicable to $C_5$-$C_{16}$ organic chemicals with a boiling point ranging from 35° C. to 250° C. Measurements are reported to a quantifiable level of 0.4 ug based on a standard air volume collection of 18 L. Individual VOCs were separated and detected by GC/MS. The total VOC measurements were made by adding all individual VOC responses obtained by the mass spectrometer and calibrating the total mass relative to toluene.

Emissions Testing—Air Concentration Determinations

Emission rates of formaldehyde, total aldehydes, and TVOC were used in a computer exposure model to determine the potential air concentrations of the pollutants. The computer model used the measured emission rate changes over the one-week time period to determine the change in air concentrations that would accordingly occur. The model measurements were made with the following assumptions: air with open office areas in the building is well-mixed at the breathing level zone of the occupied space; environmental conditions are maintained at 50% relative humidity and 73° F. (23° C.); there are no additional sources of these pollutants; and there are no sinks or potential re-emitting sources within the space for these pollutants. The USEPA's Indoor Air Exposure Model, Version 2.0, was specifically modified to accommodate this product and chemicals of interest. Ventilation and occupancy parameters were provided in ASHRAE Standard 62-1999.

Parting Strength

The parting strength of the cured blanket was determined in accordance with ASTM C686, "Parting Strength of Mineral Fiber Batt and Blanket-Type Insulation."

Tensile Strength

The tensile strength of the molded parts was determined in accordance with an internal test method KRD-161, "Tensile Strength—Dogbone method." The test was performed on specimens die cut from molded parts, prepared by molding uncured insulation in a heated press. The dogbone specimen was as specified in ASTM D638, "Standard Test Method for Tensile Properties of Plastics." A cross-head speed of 2 inches/minute (5.1 cm/minute) was used for all tests.

Bond Strength

The inter-laminar bond strength of the molded parts was performed using an internal test method KRD-162, "Bond Strength of Molded Media Products (High Density)." Molded specimens with a cross sectional area of 2 inches by 2 inches (5.1 cm by 5.1 cm) were glued to 2 inch by 2 inch (5.1 cm by 5.1 cm) wooden blocks and placed in a fixture that applied the force perpendicular to the surface of the specimen. A cross-head speed of 12 inches per minute (30.5 cm per minute) was used for all tests.

Thickness Recovery

Out-of-package and rollover thickness tests were performed on the cured blanket using ASTM C167, "Thickness and Density of Blanket of Batt Thermal Insulations."

Dust Testing

Dust testing was performed on the cured blanket using internal test procedure K-102, "Packaged Fiber Glass Dust Test, Batt Method." Dust liberated from randomly selected samples (batts) of cured blanket dropped into a dust collection box was collected on a filter and the amount of dust determined by difference weighing.

Water Absorption

Water absorption (% by weight) tests were performed on the cured blanket using ASTM C1104, "Test Method for Determining the Water Vapor Absorption of Unfaced Mineral Fiber Insulation."

Hot Surface Performance

Hot surface performance tests were performed on the cured blanket using ASTM C411, "Test Method for Hot Surface Performance of High Temperature Thermal Insulation."

TABLE 2

Testing Results for Cured Blanket Sample from EXAMPLE 11: Total VOC Emission Factors

| Exposure Time (hr) | VOC ($\mu g/m^2$)/hr | VOC Air Concentration (predicted $\mu g/m^3$) |
|---|---|---|
| 4 | 77.5 | 85 |
| 8 | 61.8 | 68 |
| 24 | 18.3 | 21 |
| 48 | 12.5 | 14 |
| 72 | 8.3 | 9 |
| 96 | 5.7 | 6 |

TABLE 3

Testing Results for Cured Blanket Sample from EXAMPLE 11: Total Aldehyde Emission Factors

| Exposure Time (hr) | Total Aldehyde ($\mu g/m^2$)/hr | Total Aldehyde Air Concentration (predicted $\mu g/m^3$) |
|---|---|---|
| 4 | 0 | 0 |
| 8 | 0 | 0 |
| 24 | 0 | 0 |
| 48 | 0 | 0 |
| 72 | 0 | 0 |
| 96 | 0 | 0 |

TABLE 1

Testing Results for Cured Binder Samples from EXAMPLE 9

| EXAMPLE NO. EXAMPLE DESCRIPTION (% solids composition) | Cure Temp | Dry Flexibility | Wet Strength | Wet Metal Adhesion | COOH/OH Ratio | Appearance |
|---|---|---|---|---|---|---|
| 1 PVA$_1$/AM/ATS/SILQUEST (32.6%:55.3%:10%:2%) | 149° C. | Flexible | Weak | Loose | 1.3:1 | Tan |
| 2 PVA$_1$/PVA$_2$/AM (30%:7.3%:62.6%) | 149° C. 177° C. | Flexible Flexible | Weak Weak | Loose Tight | 1.3:1 | Cream color Yellow |
| 3 PVA$_1$/PVA$_2$/AM (35.1%:1.9%:63.0%) | 149° C. 177° C. | Brittle Brittle | Strong Strong | Loose Loose | 1.3:1 | Tan Tan |
| 4 PVA$_1$/PVA$_2$/AM/AS/CS/MSO/SILQUEST (25.2%:1.5%:45.2%:14.7%:5.9%:5.6%:2%) | 149° C. 177° C. | Brittle Flexible | Strong Strong | Tight Loose | 1.3:1 | Brown Brown |
| 5 PVA$_1$/PVA$_2$/AM/AS/MSO/SILQUEST (26.8%:1.6%:48.7%:15.2%:5.6%:2%) | 149° C. 177° C. | — Flexible | Strong Weak | Loose Tight | 1.3:1 | Tan Brown |
| 6 PVA$_1$/PVA$_2$/AM/AS/SILQUEST (28.9%:1.7%:52.1%:15.3%:2%) | 149° C. 177° C. | Brittle Brittle | Strong Strong | Loose Loose | 1.3:1 | Opaque Brown |
| 7 PVA$_1$/PVA$_2$/AM/AS/SILQUEST (31.9%:1.9%:59.1%:5%:2%) | 149° C. 177° C. | Flexible Brittle | Strong Strong | Loose Tight | 1.3:1 | Cream color Dark orange |
| 8 PVA$_1$/PVA$_2$/AM/AS/SILQUEST (32.7%:1.9%:60.0%:5.1%:0.2%) | 149° C. 177° C. | Brittle Flexible | Strong Strong | Loose Tight | 1.3:1 | Light cream color Orange |

PVA$_1$ = MOWIOL 4-98 (98% hydrolyzed polyvinyl acetate)
PVA$_2$ = ELVANOL 51-05 (87-89% hydrolyzed polyvinyl acetate)
AM = Ammonium maleate
ATS = Ammonium para-toluene sulfonate
AS = Ammonium sulfate
SILQUEST = Gamma-aminopropyltriethoxy (A-1101) silane
CS = Corn Syrup
MSO = Maleinized soybean oil

TABLE 4

Testing Results for Cured Blanket Sample from EXAMPLE 11:
Total Formaldehyde Emission Factors

| Exposure Time (hr) | Total Formaldehyde ($\mu g/m^2$)/hr | Total Formaldehyde Air Concentration (predicted $\mu g/m^3$) |
|---|---|---|
| 4 | 0 | 0 |
| 8 | 0 | 0 |
| 24 | 0 | 0 |
| 48 | 0 | 0 |
| 72 | 0 | 0 |
| 96 | 0 | 0 |

TABLE 5

Testing Results for Cured Blanket Sample from EXAMPLE 11:
Thickness Recovery, Dust, Strength Properties, Water
Absorption, and Hot Surface Performance

| Test | Testing Result |
|---|---|
| Thickness Recovery (dead, cm.) | 3.28 ± 0.46 (3.8 cm. nom) |
| Thickness Recovery (drop, cm.) | 3.78 ± 0.56 (3.8 cm. nom) |
| Dust(mg) | 37.9 ± 4.1 |
| Tensile Strength (kg/cm width) | |
| Machine Direction | 0.23 ± 0.05 |
| Cross Machine Direction | 0.14 ± 0.03 |
| Total | 0.18 ± 0.07 |
| Parting Strength (g/g) | |
| Machine Direction | 219 ± 46 |
| Cross Machine Direction | 170 ± 49 |
| Total | 194 ± 53 |
| Bond Strength (kg/m$^2$) | 32.2 ± 4.4 |
| Water Absorption | 5.6 ± 0.7 |
| Hot Surface Performance | Pass |

While certain embodiments of the present invention have been described and/or exemplified above, it is contemplated that considerable variation and modification thereof are possible. Accordingly, the present invention is not limited to the particular embodiments described and/or exemplified herein.

The invention claimed is:

1. A formaldehyde free binder composition, comprising:
a reaction product of a polyacid component having acid groups, or anhydride or salt derivatives thereof with a plurality of polymeric polyhydroxyl components, wherein:
   i) the polyacid component and the plurality of polyhydroxyl components have an alkaline pH,
   ii) the ratio of the number of molar equivalents of acid groups, or anhydride or salt derivatives thereof, present on the polyacid component to the total number of molar equivalents of hydroxyl groups present on the plurality of polyhydroxy components is in the range from about 0.7:1 to about 1.3:1,
   iii) the polyacid component is selected from the group consisting of a dicarboxylic acid, tricarboxylic acid, tetracarboxylic acid, pentacarboxylic acid, salts and anhydride derivatives thereof, and combinations thereof,
   iv) the polymeric polyhydroxyl component is selected from the group consisting of partially hydrolyzed polyvinyl acetates, fully hydrolyzed polyvinyl acetates, and mixtures thereof, and
   v) the binder composition comprises one or more additives that increase the fluidity of the binder composition.

2. The binder composition of claim 1, wherein the ratio of the number of molar equivalents of acid groups, or anhydride or salt derivatives thereof, present on the polyacid component to the total number of molar equivalents of hydroxyl groups present on the plurality of polyhydroxy components is about 1:1.

3. The binder composition of claim 1, wherein thermal curing produces a substantially water-insoluble thermoset polyester resin, or a salt thereof.

4. The binder composition of claim 1 further comprising ammonia or a salt thereof.

5. The binder composition of claim 1 further comprising a catalyst that increases the rate of ester formation.

6. An insulation product, comprising:
glass fibers in contact with an alkaline formaldehyde-free binder composition, wherein:
   (i) the binder composition includes a reaction product of a polycarboxylic acid component with a fully hydrolyzed polyvinyl acetate,
   (ii) the polycarboxylic acid component is selected from the group consisting of a dicarboxylic acid, tricarboxylic acid, tetracarboxylic acid, pentacarboxylic acid, salts and anhydride derivatives thereof, and combinations thereof, and
   (iii) the binder composition includes one or more additives that increase the fluidity of the binder composition.

7. The insulation product of claim 6, wherein the fully hydrolyzed polyvinyl acetate includes a 98% to 99.9% hydrolyzed polyvinyl acetate.

8. The insulation product of claim 6, wherein the insulation product has an average thickness recovery of greater than 3 centimeters as determined using a testing procedure as described by ASTM C167.

9. The insulation product of claim 6, wherein the ratio of the number of molar equivalents of acid groups, or anhydride or salt derivatives thereof, present on the polycarboxylic acid component to the total number of molar equivalents of hydroxyl groups present on the fully hydrolyzed polyvinyl acetate is in the range from about 0.7:1 to about 1.3:1.

* * * * *